United States Patent [19]
Barlow

[11] Patent Number: 4,932,040
[45] Date of Patent: Jun. 5, 1990

[54] BIDIRECTIONAL CONTROL SIGNALLING BUS INTERFACE APPARATUS FOR TRANSMITTING SIGNALS BETWEEN TWO BUS SYSTEMS

[75] Inventor: George J. Barlow, Tewksbury, Mass.

[73] Assignee: Bull HN Information Systems Inc., Billerica, Mass.

[21] Appl. No.: 129,278

[22] Filed: Dec. 7, 1987

[51] Int. Cl.⁵ .................................................. H04L 7/04
[52] U.S. Cl. ................................ 375/111; 364/200; 364/240.2; 364/271
[58] Field of Search ... 364/200 MS File, 900 MS File; 370/88, 103; 375/107, 110, 111, 106

[56] References Cited

U.S. PATENT DOCUMENTS

| | | | |
|---|---|---|---|
| 3,961,270 | 6/1976 | Ullmann et al. | 375/107 |
| 4,570,220 | 2/1986 | Tetrick et al. | 364/200 |
| 4,682,285 | 7/1987 | Ozil et al. | 364/200 |
| 4,696,019 | 9/1987 | Tulpule et al. | 375/107 |
| 4,763,320 | 8/1988 | Rudolph et al. | 370/85 |
| 4,794,596 | 12/1988 | Gloyne et al. | 370/103 |

OTHER PUBLICATIONS

Designers Confront Metastability in Boards and Buses by John Beaston & R. Scott Tetrick, Computer Design, Mar. 1, 1986, pp. 67-71.

Primary Examiner—Gareth D. Shaw
Assistant Examiner—Debra A. Chun
Attorney, Agent, or Firm—Faith F. Driscoll; John S. Solakian

[57] ABSTRACT

A synchronizing apparatus couples two independently operated bus systems, each bus system capable of generating asynchronous control signals for controlling the states of all of the units within the entire system. The apparatus includes a pair of synchronizer storage elements, each connected to receive, store, and transmit an asynchronous control signal from one of the bus systems to the other bus system. The synchronizer elements are connected to receive a set of complementary clocking signals from a timing source. Both synchronizer elements are interconnected so that by decoding the internal states of such elements only one of the control signals will be transmitted when both synchronizer elements simultaneously receive control signals from both buses thereby ensuring reliable operation throughout the entire system.

28 Claims, 4 Drawing Sheets

BIDIRECTIONAL CONTROL SIGNALLING BUS INTERFACE APPARATUS FOR TRANSMITTING SIGNALS BETWEEN TWO BUS SYSTEMS

RELATED APPLICATION

1. "Inter and Intra Priority Resolution Network for an Asynchronous Bus System", invented by George J. Barlow, which issued as U.S. Pat. No. 4,901,226 on Feb. 13, 1990 and assigned to the same assignee as named herein.

BACKGROUND OF THE INVENTION

1. Field of Use

This invention relates to synchronizing operations and more particularly to synchronizing operations taking place within two independently operated systems.

2. Prior Art

In certain situations, it becomes desirable to be able to interconnect two independently operated bus systems for exchanging information therebetween. In such systems, it is possible to encounter deadlock conditions where units on both bus systems attempt to communicate with each other in close time proximity through the same communication path. To avoid this situation, one system has used an intersystem link (ISL) logic unit for controlling the bidirectional transfer of information requests. This type of unit is described in U.S. Pat. No. 4,234,919.

In the above type of system, all information transfers were established on a master/slave basis, with the unit requesting and being granted access to the bus becoming the master and the unit being addressed by the master becoming the slave. Accordingly, when the system was powered up, the user established which system was to become the master and the other the slave. This in turn also established the procedure for initializing or clearing both systems (i.e., through the master unit).

In certain systems, it becomes difficult and impractical to establish a discipline or procedure by which one system initializes the other system. For example, in the case of two independently operated bus systems, each system bus could have units which could generate initialize or clear signals as part of a normal operating sequence (e.g. communication units). Thus, both clear signals could occur in close proximity to each other or in certain instances approximately at the same time.

It has been frequently found that the two system buses are interconnected so that the receiving circuit from one bus is coupled to the transmitting circuit of the other bus and the receiving circuit of the other bus is coupled to the transmitting circuit of the one bus. This arrangement creates a deadlock condition when it is powered on. To avoid this situation, some systems have used delay lines and delay line edge detector circuits for detecting which signal was first received. However, while this solves the situation when the signals occur in close proximity to each other, it does not overcome the instances where the signals arrive simultaneously. The result is that the circuits tend to oscillate at the delay line circuit frequency.

Accordingly, it is object of the present invention to provide an improved arrangement for interconnecting two independently operated bus systems.

It is a further object of the present invention to provide bus interconnection apparatus which bidirectionally transmits control signals in a reliable manner.

SUMARY OF THE INVENTION

The above and other objects of the present invention are achieved in a preferred embodiment of the interconnection bidirectional signalling apparatus of the present invention. The apparatus includes at least one synchronizing device which bidirectionally transmits a predetermined asynchronous control signal between two bus systems. Each system bus has a plurality of units capable of independently generating such asynchronous control signal for placing all of the units of the entire system in a particular state. The synchronizing device has a pair of synchronizer elements, each being individually connected to receive, store and retransmit an asynchronous control signal from one bus system to the other bus system.

The synchronizer elements each includes a pair of series connected storage elements which are connected to receive a set of complementary clocking signals from a common timing source. Each complementary clocking signal is connected to a different one of the series connected storage elements to establish a predetermined out of phase relationship. The rate of the complementary clocking signals is selected as to overcome any metastability in the operation of the synchronizer storage elements.

In one case, the outputs of both synchronizer elements are interconnected in a feedback arrangement so that only one of the synchronizer elements is enabled to retransmit a control signal as a function of the states of the synchronizer storage elements when an asynchronous control signal is received by one or both synchronizer devices from both bus systems. This ensures that the operation of the entire system proceeds in a reliable fashion. In another case, the states of the synchronizer storage elements are decoded so as to retransmit the asynchronous control signal of a particular one of the bus system giving it priority over the other bus system.

Additionally, the synchronizer device is implemented so that the condition or system state defined by the asynchronous control signal which will persist until the later arriving control signal of the two overlapping control signals has returned to a normal state. This becomes particularly important in the case where the asynchronous control signals are power failure signals.

In such instances, it is important to have the entire system remain in a power fail state or condition until both power failure control signals return to the normal operating state. Another feature of the present invention is that the synchronizer device can be enabled to generate the control signal under microprogram or firmware control.

The arrangement of the present invention also minimizes the time required for resolving priorities when there is simultaneous transmission of asynchronous control signals. Further, this is accomplished with a minimum amount of complexity by using a combination of positive and negative logic.

The novel features which are believed to be characteristic of the invention both as to its organization and method of operation, together with further objects and advantages will be better understood from the following description when considered in connection with the accompanying drawings. It is to be expressly understood, however, that each of the drawings are given for the purpose of illustration and description only and are not intended as a definition of the limits of the present invention.

BRIEF DESCRIPTION OF THE DRAWINGS

FIG. 3 is a timing diagram used to explain the resolver circuit of FIG. 2a.

DESCRIPTION OF THE PREFERRED EMBODIMENT

Figure 1:
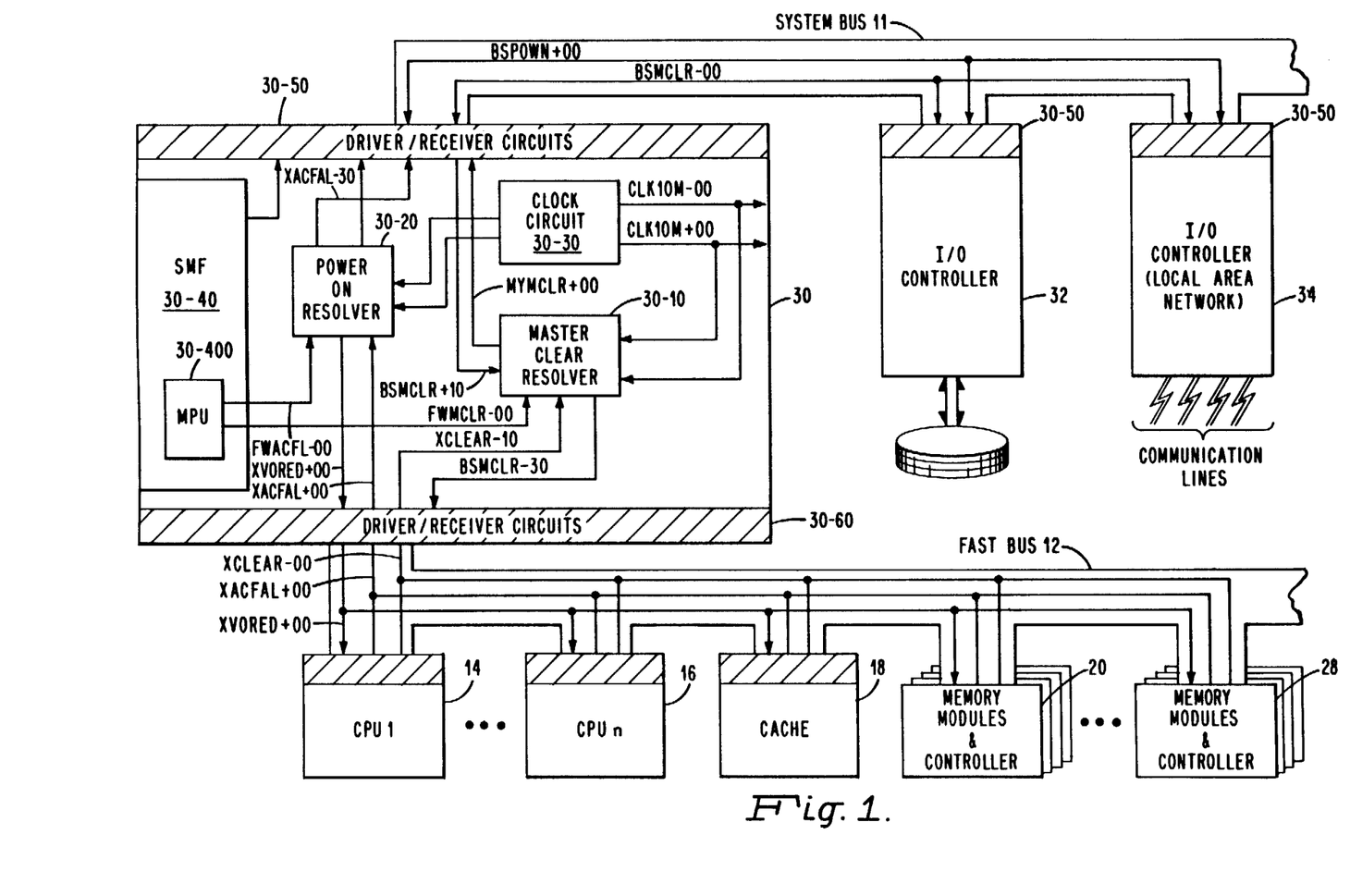
FIG. 1 is a block diagram of a preferred embodiment of a data processing system which includes the apparatus of the present invention.

FIG. 1 shows a data processing system 10 which includes a plurality of identical central processing units (CPUs) 14 through 16, a cache memory 18 and a plurality of memory controllers 20 and 28, each of which controls the operation of a number of memory modules included therein. All of these units couple in common to a high speed synchronous local bus system 12 as shown.

The high speed local bus system 12 couples through a bus interface unit (BIU) 30 to a bus system 11. As shown, a plurality of different subsystems also couple in common to bus system 11. The illustrative different subsystems include a disk controller 32 and a local area network controller 34. Each of the subsystems and BIU 30 includes an interface area 30-50 which enables the unit or units associated therewith to transmit or receive requests in the form of commands, interrupts, data or responses/status to another unit or bus system 11 in an asynchronous manner.

The bus system 11 further includes a termination network, not shown, located at the left end of the bus system 11. This network defines the high priority end of bus system 11. In the system configuration shown, BIU 30, which is positioned next to the termination network, has the highest priority.

In addition to command, address and data lines, each of the bus systems 11 and 12 include a plurality of lines for transferring a number of miscellaneous signals. These include master clear and power on signals. In bus system 11, these signals correspond to BSMCLR−00 and BSPOWN+00 of FIG. 1. In bus system 12, the signals correspond to XCLEAR−00 and XVORED+00 in FIG. 1.

According to the present invention, BIU 30 includes a plurality of resolver circuits 30-10 and 30-20, in addition to a clock circuit 30-30. The clock circuit 30-30 is a 10 megahertz clock which can be used to synchronize operations within the microprocessors included in CPUs 14 and 16. While clock circuit 30-30 is shown as a separate block in FIG. 1, it could be considered as part of the system clock utilized by CPUs 14 and 16. BIU 30 also includes a microprogrammed system maintenance facility unit (SMF) 30-40 having a microprocessing unit 30-400 for performing various monitoring, testing and diagnostic operations. The MPU 30-400 under firmware control generates control signals for placing the entire system of FIG. 1 in a given state utilizing resolvers 30-10 and 30-20 as explained herein.

Figure 2A:
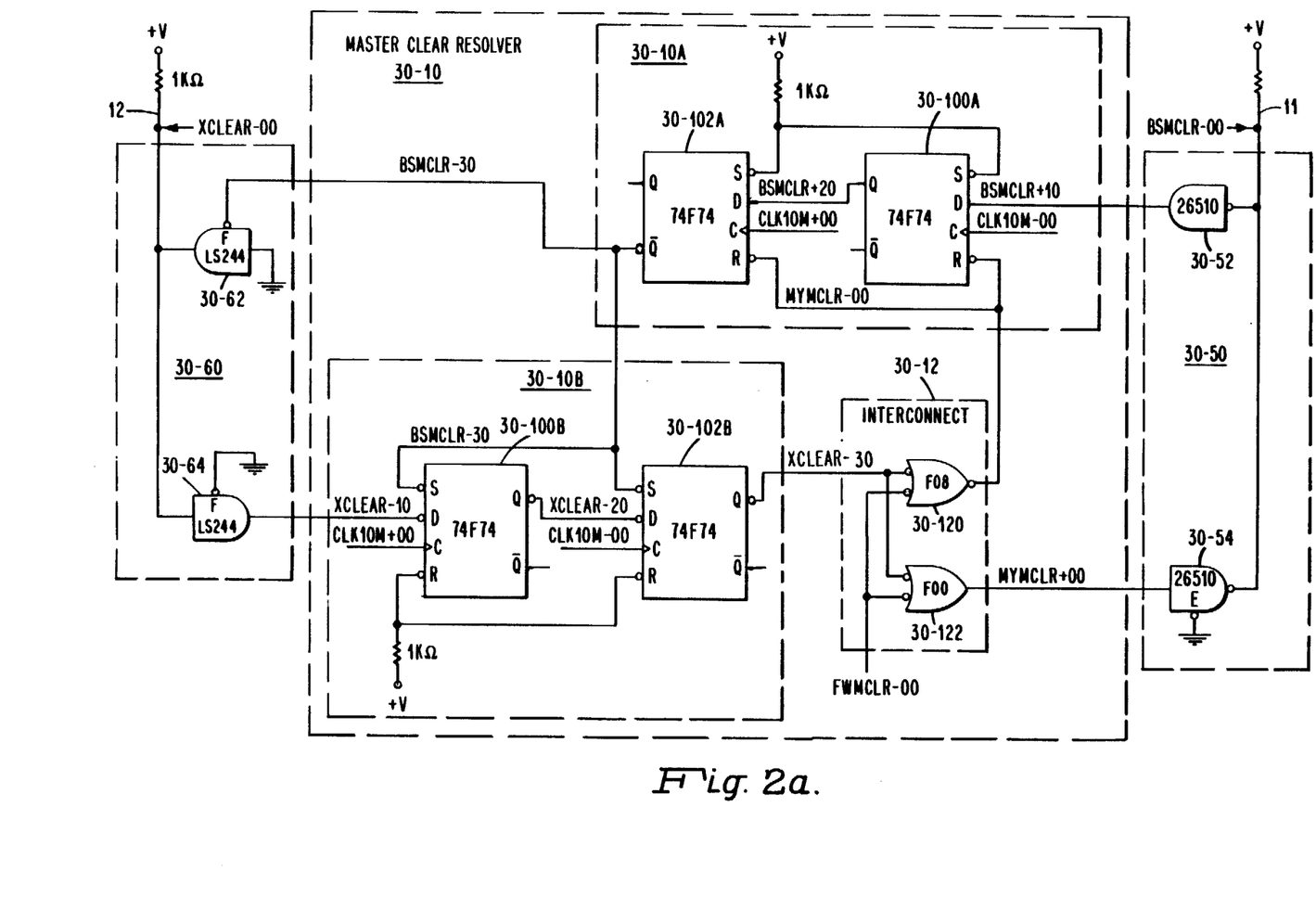
FIGS. 2a and 2b illustrate in greater detail, the apparatus of the present invention.
Figure 2B:
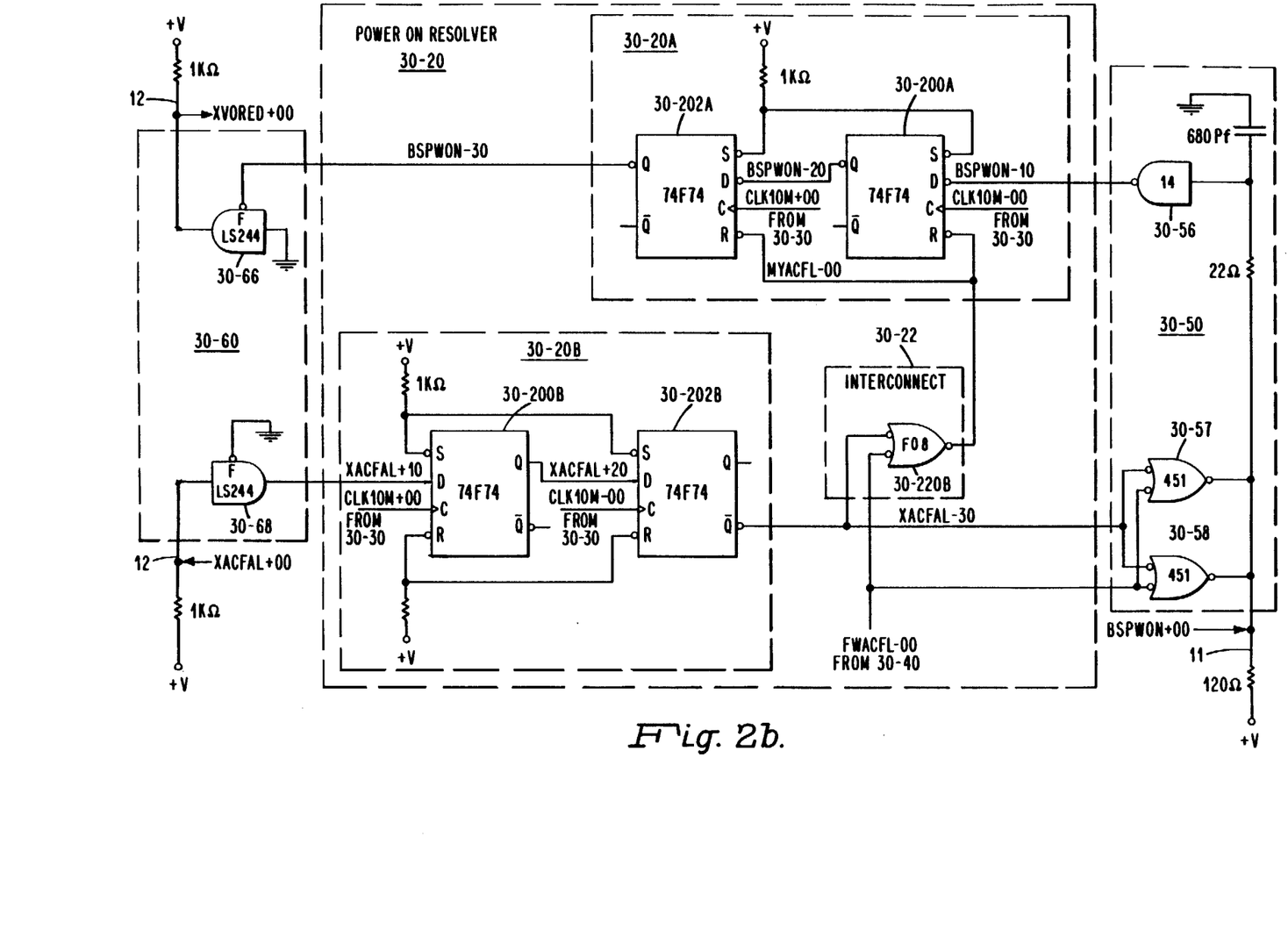

FIGS. 2a and 2b show in greater detail, the master clear resolver 30-10 and power on resolver 30-20 constructed according to the principles of the present invention. Referring first to FIG. 2a, it is seen that master clear resolver circuit 30-10 includes a pair of synchronizer elements 30-10A and 30-10B. Each synchronizer element includes a pair of series connnected flip-flops 30-100 and 30-102. The flip-flops are constructed from 74F74 type flip-flop circuits which have a short transition or settling time of approximately 18 nanoseconds.

The preset input terminal(s) of each of the flip-flops 100A and 102A connect to a positive voltage +V through a 1 kilohm load resistor. The flip-flops 100A and 102A are connected to receive a different one of a pair of complementary clocking signals CLK10M+00 and CLK10M−00 from clock circuit 30-30.

A first system bus 11 master clear flip-flop 30-100A is connected to receive bus master clear signal BSMCLR−00 from bus system 11 which is inverted and applied by a receiver circuit 30-52 to data input terminal as signal BSMCLR+10. Flip-flop 30-100A is clocked by negative clock signal CLK10M−00 which synchronizes the operation of resolver 30-10A with bus system 11. This produces a stable output signal BSMCLR+20 after a period of 18 nanoseconds.

The second system bus 11 master clear flip-flop 30-102A is clocked by positive clock signal CLK10M+00 to resolve any race condition between signal BSMCLR+20 and a master clear signal XCLEAR−00 from local bus system 12. The flip-flop 30-102A produces as an output, master clear signal BSMCLR−30 which is inverted and applied to bus system 12 via a driver circuit 30-62. Also, signal BSMCLR−30 is applied to the preset terminal(s) of both bus system 12 master clear flip-flops 30-100B and 30-102B.

The first system bus 12 master clear flip-flop 30-100B is clocked by positive clock signal CLK10M+00 and receives master clear signal XCLEAR−10 from bus system 12 via receiver circuit 30-64. This signal synchronizes the operation of resolver 30-10B with bus system 12 producing a stable output signal XCLEAR−20 after a period of 18 nanoseconds. The second bus system 12 master clear flip-flop 30-102B is clocked by negative clock signal CLK10M-00 to resolve any race condition between signal XCLEAR−20 and a master clear signal BSMCLR−00 from bus system 11. The flip-flop 30-102B produces as an output, master clear signal XCLEAR−30 which is applied to bus system 11 via driver circuit 30-54 through an interconnect network 30-12. The interconnect network 30-12 includes a NOR gate 30-120 and an OR gate 30-122, each of which has inverting inputs. First and second inverting inputs are connected to receive signals XCLEAR−30 and FWMCLR−00.

NOR gate 30-120 forces my master clear negative signal MYMCLR−00 to a binary ZERO or low in response to bus system 12 master clear signal XCLEAR−30 or firmware clear signal FWMCLR−00 from microprocessor 30-400 being forced to a binary ZERO or low. The signal MYMCLR−00 is applied to the reset (R) terminals of both the bus system master clear flip-flops preventing them from being set. OR gate 30-122 of interconnect network 30-12 operates to force my master clear positive signal MYMCLR+00 to a binary ONE in response to either signal XCLEAR−30 or signal FWMCLR-00 being forced to a binary ZERO state.

As seen from FIG. 2b, the power on resolver circuit 30-20 also includes a pair of synchronizer elements 30-20A and 30-20B. Each synchronizer element includes a pair of series connected flip-flops 30-200 and 202. The flip-flops are constructed from 74F74 type flip-flop circuits.

The preset input terminal(s) of each of the flip-flops 200A and 202A connect to a positive +V voltage through a 1 kilohm load resistor. The first bus system 11 power on flip-flop 30-200A is connected to receive bus power on signal BSPWON+00 which is inverted and applied by a receiver circuit 30-56 to a data input terminal as signal BSPWON−10. Flip-flop 30-200A is clocked by negative clock signal CLK10M−00 which synchronizes the operation of resolver 30-20 with bus system 11. This produces a stable output signal BSPWON−20 after a period of 18 nanoseconds. The second bus system 11 power on flip-flop 30-202A is clocked by positive clock signal CLK10M+00 to resolve any race condition between signal BSPWON−20 and an AC failure signal XACFAL+00 from local bus system 12. The flip-flop 30-202A produces as an output, a local bus system voltage red signal XVORED+00 from signal BSPWON−30 which is inverted and applied to local bus system 12 via a driver circuit 30-66.

The first bus system 12 AC failure flip-flop 30-200B is clocked by positive clock signal CLK10M+00 and receives AC failure signal XACFAL+00 from bus system 12 via receiver circuit 30-68. This signal synchronizes the operation of resolver 30-20B with bus system 12 producing a stable output signal XACFAL+20 after a period of 18 nanoseconds.

The second bus system 12 AC failure flip-flop 30-202B is clocked by negative clock signal CLK10M−00 to resolve any race condition between signal XACFAL+20 and a power on signal BSPON+00 from bus system 11. The flip-flop 30-202B produces as an output, power on signal XACFAL−30 which is applied to bus system 11 via driver circuits 30-57 and 30-58. Additionally, signal XACFAL−30 is applied to the reset input terminals of bus system 11 power on flip-flops 30-200A and 30-202A via an inverting input NOR gate 30-220 of an interconnect network 30-22. Additionally, the driver circuits 30-57 and 30-58 receive a firmware generated power on signal FWACFL−00 from microprocessor 30-400.

It will be noted that since bus 11 uses inverting receiver and inverting transmitter bus circuits, the synchronizers which retransmit signals from such bus are implemented in positive logic. In the case of bus 12, noninverting receiver and transmitter bus circuits are used. The synchronizers which retransmit signals from bus 12 are implemented in negative logic.

DESCRIPTION OF OPERATION

With reference to FIGS. 1, 2a, 2b and the timing diagram of FIG. 3, the operation of the resolver circuits of the present invention will now be described.

Master Clear Resolver 30-10

The flip-flops 30-100A and 30-100B continuously sample the states of bus clear signals BSMCLR−00 and XCLEAR−00 respectively applied to the bus clear lines. These signals are sampled at different time periods defined by clock signals CLK10M−00 and CLK10M+00. When one of the units of bus system 11, such as LAN controller 34 signals a clear condition, it forces master clear signal BSMCLR−00 to a binary ZERO or low. The asynchronous signal BSMCLR−00 is inverted by receive circuit 30-52 and applied as a positive input signal BSMCLR+10, normally inactive, to the first flip-flop 30-100A. This positive signal BSMCLR+10 is clocked into flip-flop 30-100A in response to negative clock signal CLK10M−00 as seen in FIG. 3. After a period of 50 nanoseconds, the positive or binary ONE signal BSMCLR+20 is clocked into second flip-flop 30-102A in response to positive clock signal CLK10M+00.

Thereafter, the binary ZERO signal BSMCLR−30 from the Q negation side of flip-flop 30-102A enables inverting driver circuit 30-62 to force local bus system 12 clear signal XCLEAR−00 to a binary ZERO or low. At the same time as shown in FIG. 3, signal BSMCLR−30 forces both local synchronizer flip-flops 30-100B and 30-102B to binary ONE states preventing a clear signal from bus system 12 from being received and stored by synchronizer 30-10B. This continues until master clear signal BSMCLR−00 has been removed from bus system 11.

Figure 3:
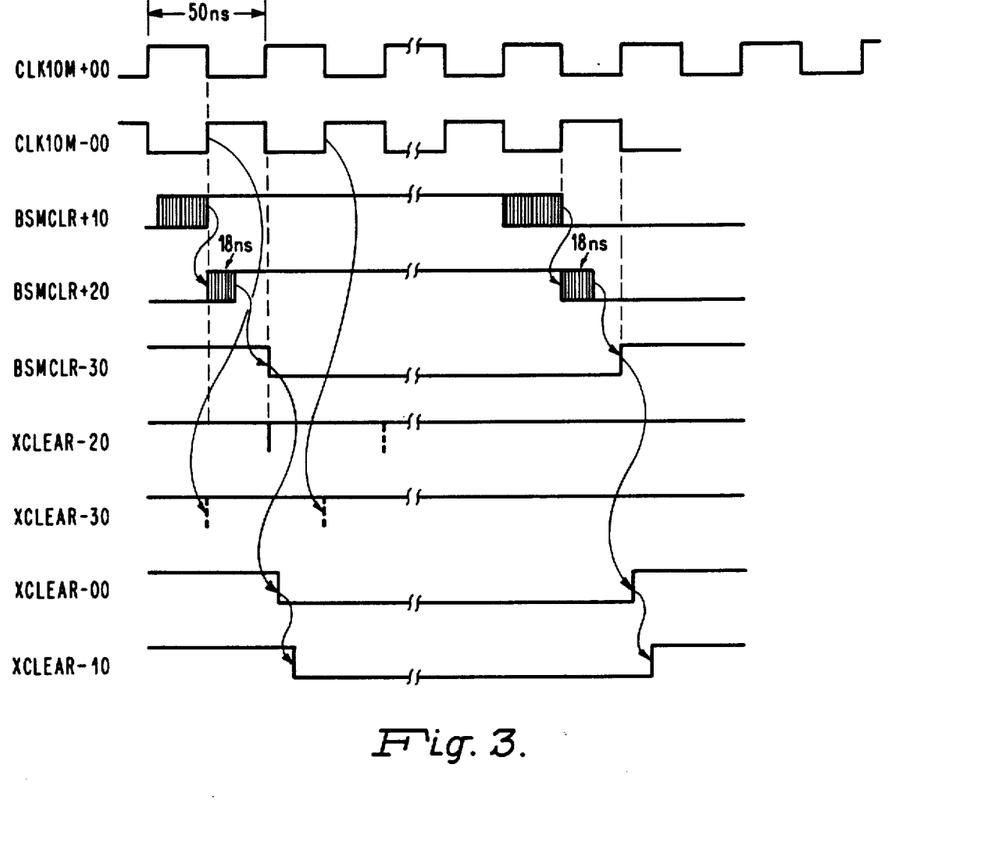

Summarizing the above, as seen from FIG. 3, the pair of synchronizer flip-flops 30-100A and 30-102A receive the asynchronous master clear signal BSMCLR−00, resolve any metastable condition (i.e., 18 nanoseconds maximum) and retransmit a clean output pulse to local bus system 12. At the same time, the synchronizer 30-10A prevents any lock-up or oscillatory condition by forcing synchronizer 30-10B to a predetermined state.

Similarly, when one of the units of bus system 12 signals a clear condition, it forces master clear signal XCLEAR−00 to a binary ZERO or low. The binary ZERO or low asynchronous negative master clear signal applied to local bus system 12 is applied by noninverting receiver circuit 30-64 as input signal XCLEAR−10 (normally inactive) to first flip-flop 30-100B. Signal XCLEAR−10 is clocked into flip-flop 30-100B in response to positive clock signal CLR10M+00. After a period of 50 nanoseconds, the binary ZERO signal XCLEAR−20 is clocked into second flip-flop 30-102B in response to negative clock signal CLK10M−00. The binary ZERO output signal XCLEAR−30 is applied to the reset terminals of pair of flip-flops 30-100A and 30-102A. This resets to ZEROS or overrides the states of flip-flops 30-100A and 30-102A. Stated differently, both flip-flops are blocked for the period of time that flip-flop 30-102B is transmitting a master clear signal MYMCLR+00 to bus system 11 via inverting driver circuit 30-54. This continues until local bus system clear signal XCLEAR−10 is removed from local bus system 12. That is, the effect of the clear pulse signal is no longer present.

Thus, each of the synchronizers, by having their outputs cross coupled or fed back to the other's DC reset and preset input terminals, block or inhibit each other so as to prevent a lockup or oscillation condition. At the same time, the synchronizers resolve the relative priorities of the bus system master clear signals BSMCLR−00 and XCLEAR−10 occurring simultaneously by ensuring that only one synchronizer changes state at a time. That is, by utilizing out of phase clock signals CLK10M+00 and CLK10M−00 connected to flip-flops 100A and 100B respectively generated from a common clock circuit, this ensures that flip-flops 100A and 100B do not change state at the same time and override the other. At the same time, positive and negative clock signals CLK10M+00 and CLK10M−00 applied to the flip-flops of each synchronizer transform a totally asynchronous signal into a stable output signal having a clean well defined leading edge. Lastly, the out of phase clock signals ensure that the effects of the master clear pulses are over before a synchronizer is able to respond to the condition of the master clear bus line.

Also, as seen from FIG. 2a, local bus system 12 can also generate a master clear signal under firmware control. This could be done to test the bus system logic circuits. For example, by forcing signal FWMCLR−00 to a binary ZERO or low, this causes master clear signal BSMCLR−00 to be applied to bus system 11. It is assumed that the flip-flop which generates signal FWMCLR−00 is clocked by signal CLK10M−00. This is the same signal as that used to clock flip-flop 30-100A. This causes synchronizer 30-10A to subsequently send out master clear signal BSMCLR−30 onto local bus system 12. At the same time, signal BSMCLR−30 inhibits synchronizer 30-10B from responding to local bus master clear signal XCLEAR−10. Signal XCLEAR−10 is used to reset the flip-flop which generates signal FWMCLR−00. By preventing the transfer of the firmware generated master clear signal to local bus system 12, the local bus system can proceed to test bus system 11 as required.

Power on Resolver 30-20

Referring to FIG. 2b, it is seen that synchronizer 30-20B operates to transmit a change in state of local bus system AC failure signal XACFAL+00 to bus system 11. That is, signal XACFAL+00 when forced to a binary ONE or high by the local bus system 12 indicates a loss in AC power within local bus system 12. This causes receiver circuit 30-68 to force normally inactive signal XACFAL+10 to a binary ONE. The signal is clocked into first flip-flop 30-200B in response to positive clock signal CK10M+00. A period of 50 nanoseconds later, the binary ONE signal XACFAL+20 stored in flip-flop 30-200B is loaded into flip-flop 30-202B in response to negative clock signal CLK10M−00. Thereafter, local bus system failure signal XACFAL−30 at the Q negation side of the output of flip-flop 30-202B is applied to bus system 11 via driver circuits 30-57 and 30-58.

Signal XACFAL−30 causes interconnect gate 30-220B to force signal MYACFL−00 to a binary ZERO which is applied to the reset input terminals of the synchronizer flip-flops 30-200A and 30-202A. This inhibits or prevents synchronizer 30-20 from storing any change in state in power on signal BSPWON+10 received from bus system 11. Thus, it overrides all other system conditions.

Similarly, synchronizer 30-20 operates to store any change of state in bus power on signal BSPWON+00. When signal BSPWON+00 is caused to switch to a binary ZERO or low, inverting receiver circuit 30-56 switches signal BSPWON−10 to a binary ONE indicating that power has been removed from bus system 11. The binary ONE signal BSPWON−10 is clocked into flip-flop 30-200A in response to negative clock signal CLK10M−00. After a period of 50 nanoseconds, the binary ONE signal BSPWON−20 stored in flip-flop 30-200A is clocked into flip-flop 30-202A in response to positive clock signal CLK10M+00. This resolves any conflict with the local bus system signals. Thereafter, signal BSPWON−30 is forced to a binary ONE causing driver circuit 30-66 to force voltage red signal XVORED+00 to a binary ONE. This signals the local bus system 12 of the change in power-on status of bus system 11.

Additionally, the local bus system is able to generate a firmware AC Failure signal FWACFL−00 for test purposes. Again, the flip-flop generating the signal must be clocked with the same clock signal used to clock flip-flop 30-202A. Also, this signal will be generated (i.e., switched low) only after the clock circuits produce a stable output. When generated, signal FWACFL−00 causes driver circuits 30-57 and 30-58 to force power-on signal BSPWON+00 to a binary ZERO. The signal FWACFL−00 causes gate 30-220B to hold or block the synchronizer 30-20 flip-flops from responding to the change in state in bus system power-on signal BSPWON+00. This permits only testing to take place.

From the above, it seen how the present resolver circuits ensure the reliable transmission of static asynchronous master clear and power-on signals between bus systems 11 and 12. The use of both positive and negative logic for implementing the synchronizers reduces complexity while increasing reliability.

It will be appreciated that many changes may be made to the preferred embodiment. For example, the operating characteristics of both bus systems 11 and 12 may be changed (e.g. positive or negative logic synchronous, asynchronous, etc.). Also, the timing source need not be associated or connected in any way to a particular bus system. Also, the invention is not limited to the type of flip-flops or signal polarities. Other changes will also occur to those skilled in the art.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. Bidirectional control signalling resolver apparatus for transmitting control signals between a pair of independently operated bus systems, said apparatus comprising:
   a pair of synchronizer devices, each device having a control signal input and a control signal output, said control signal input and output of a first synchronizer device being connected to a first and a second bus system of said pair of bus systems respectively, and said control signal input and output of a second synchronizer device being connected to said second and said first bus systems respectively, each of said synchronizer devices having series connected input and output stages connected to said control signal input and output respectively, each of said input and output stages including a clock input, said input and output stages respectively of said first synchronizer device being connected to receive first and second complementary clock signals respectively generated at a predetermined rate and said input and output stages of said second synchronizer device being connected to receive said second and first complementary clock signals respectively; and
   first means connecting said control signal output of one of said first and second synchronizer devices as an input to said input and output stages of another one of said first and second synchronizer devices, said first means enabling only said one of said first and second synchronizer devices to retransmit said control signals received on said control signal input of said one synchronizer device from a corresponding one of said bus systems through said input and output stages to said control signal output of said one synchronizer device and to another one of said bus systems when control signals are concurrently generated on said first and second bus systems.

2. The apparatus of claim 1 wherein said predetermined rate of said complementary clock signals is selected to overcome any metastability in the operation of said pair of synchronizer devices.

3. The apparatus of claim 1 wherein said apparatus operates to transfer asynchronously generated clearing signals applied to commonly connected receive and transmit paths of each of said bus systems for forcing units connected to said each of said bus systems to a predetermined state, said first means connecting said control output of said first synchronizer device to said input and output stages of said second synchronizer device and generating a control signal for forcing said input and output stages of said second synchronizer device to the same predetermined state in response to a clearing signal being received from said first bus system.

4. The apparatus of claim 3 wherein said predetermined state is an active or a binary ONE state.

5. The apparatus of claim 3 wherein said apparatus includes second means for connecting said control output of said second synchronizer device to said input and output stages of said first synchronizer device, said second synchronizer device generating a control signal to inhibit said first and second stages of said first synchronizer device from switching state in response to a clearing signal received from said second bus system while said second synchronizer device is retransmitting said clearing signal to said first bus system.

6. The apparatus of claim 5 wherein said input and output stages of said first synchronizer device are held in an inactive or a binary ZERO state until said clearing signal from said second bus system is removed.

7. The apparatus of claim 5 wherein said second means includes gating means having a first input for receiving a program generated control signal from a processing unit, a second input connected to the control output of said second synchronizer device and an output connected to said first bus system, said gating means in response to said program generated control signal applying a clearing signal to said first bus system for testing said first bus system through said first synchronizer device while said first synchronizer device inhibits said second synchronizer device from responding to a clearing signal received from said second bus system.

8. The apparatus of claim 1 wherein each of said input and output stages of each synchronizer device includes a clocked synchronizer storage element having a short settling time relative to said predetermined rate of said first and second complementary clock signals.

9. The apparatus of claim 1 wherein said one of said first and second synchronizer devices has said control signal input connected to one of first and second bus systems which has separate transmit and receive paths for transmitting and receiving said control signals and whose transmission is to have priority in transmitting said control signals.

10. The apparatus of claim 1 wherein said apparatus operates to transfer asynchronously generated power failure control signals applied to each of said bus systems for indicating when that bus system is in a power failure state, said first means connecting said control output of said second synchronizer device to said first and second stages of said first synchronizer device, said second synchronizer device in response to a power failure control signal received from said second bus generating a control signal for overriding said first synchronizer device from storing any change in state in said first bus system while said second synchronizer device retransmits said power failure control signal to said first bus system.

11. The apparatus of claim 10 wherein said first and second stages of said first synchronizer device are held in an inactive or binary ZERO state until said power failure control signal from said second bus system is removed.

12. The apparatus of claim 10 wherein said first means includes gating means having a first input for receiving a program generated control signal from a processing unit, a second input connected to said control output of said second synchronizer device and an output connected to said first bus system, said gating means in response to said program generated control signal applying a power failure control signal from testing said first bus system while said first synchronizer device inhibits said second synchronizer device from responding to a power control signal received from said second bus system.

13. Bidirectional control signalling apparatus for transmitting a plurality of control signals between first and second independently operated bus systems, said apparatus comprising:
  a number of resolvers, each resolver for synchronizing transmission of a different one of said plurality of control signals along transmit and receive paths of said bus systems, said each resolver including:
    a plurality of inputs and a plurality of outputs, first and second inputs being connected to said receive paths of said first and second bus systems respectively, third and fourth inputs being connected to receive first and second complementary clock signals respectively, generated at a predetermined rate, and first and second outputs being connected to said transmit paths of first and second bus systems respectively; and,
    a pair of synchronizer devices, each device having a data input, a pair of clock inputs and a data output, said data input and data output of a first device of said pair being connected to said first and said second bus systems respectively, said data input and said data output of a second device of said pair being connected to said second and first bus systems respectively and said pair of clock inputs being connected to said second and third inputs receive said first and second complementary clock signals, each of said devices further including series connected input and output bistable stages connected to said data input and said data outputs respectively, each of said stages including a clock input, said clock inputs of said input and output stages of said first device being connected to said third and fourth inputs to receive said first and second complementary clock signals and said clock inputs of said input and output stages of said second device being connected to said fourth and third inputs, respectively, to receive said second and first complementary clock signals; and,
    first circuit means for internally interconnecting said data inputs and data outputs of said first and second synchronizer devices of a first resolver of said number of resolvers so as to provide a pair of feedback paths between said first and second devices,
    said first circuit means equally enabling only one of said control signals applied to said data inputs of corresponding ones of said synchronizer devices to be retransmitted between commonly connected transmit and receive paths of said first and second bus systems when said control signals are concurrently generated by said first and second bus systems.

14. The apparatus of claim 13 wherein said apparatus further includes:
second means for internally interconnecting only one of said data inputs and data outputs of said synchronizer devices of a second resolver of said number of resolvers so as to provide a feedback path between said devices of said second resolver, said second means enabling only one of said control signals applied to said data inputs of corresponding ones of said resolvers to be retransmitted between separately connected transmit and receive paths of one of said first and second bus systems when said control signals are concurrently generated on said first and second bus systems.

15. The apparatus of claim 13 wherein said predetermined rate of said set of complementary clock signals is selected to overcome any metastability in the operation of said pair of synchronizer devices.

16. The apparatus of claim 13 wherein said first resolver operates to bidirectionally transfer asynchronously generated clearing signals applied to each of said bus systems for forcing units connected to said first and said second bus systems to an initial state, said first means including gating means for connecting said data output of said second synchronizer device to said input and output stages of said first synchronizer device, said gating means generating a control signal for application to said first synchronizer device through one of said pair of feedback paths to force said input and output stages to the same predetermined state in response to a clearing signal being received from said first bus system.

17. The apparatus of claim 16 wherein said predetermined state is an inactive or a binary ZERO state.

18. The apparatus of claim 16 wherein said first means further includes conductor means for connecting said data output of said first synchronizer device to said input and output stages of said second synchronizer device, said conductor means applying a control signal through another one of said pair of feedback paths to prevent said first and second stages of said second synchronizer device from switching state in response to a clearing signal received from said second bus system while said first synchronizer device is retransmitting said clearing signal from said first to said second bus system.

19. The apparatus of claim 18 wherein said input and output stages of said second synchronizer device are held in a binary ONE state until said clearing signal from said second bus system is removed.

20. The apparatus of claim 16 wherein said gating means has a first input for receiving a program generated control signal from a processing unit, a second input connected to the data output of said second synchronizer device and an output connected to said first bus system, said gating means in response to said program generated control signal applying a clearing signal to said first bus system for testing said first bus system through said first synchronizer device while inhibiting said second synchronizer device from responding to a clearing signal received from said second bus system.

21. The apparatus of claim 13 wherein each of said input and output bistable stages of each synchronizer device has a short settling time relative to said predetermined rate of said complementary clock signals.

22. The apparatus of claim 13 wherein said second means of said second resolver is connected to said data outputs of said second synchronizer device defining that said second bus system has priority over said first bus system.

23. The apparatus of claim 13 wherein said second resolver operates to transfer asynchronously generated power failure control signals applied to each of said bus systems for indicating when that bus system has switched to a power failure state, said second means connecting said data output of said second synchronizer device to said input and output bistable stages of said first synchronizer device, said second synchronizer device in response to a power failure control signal received from said second bus system generating a control signal for overriding said first synchronizer device from storing any change in state in said first bus system while said second synchronizer device is retransmitting said power control signal from said second bus system to said first bus system.

24. The apparatus of claim 23 wherein said first and second stages of said first synchronizer device are held in a binary ZERO state until said power control signal from said first bus system is removed.

25. The apparatus of claim 23 wherein said second means includes gating means having a first input for receiving a program generated control signal from a processing unit, a second input connected to said data output of said second synchronizer device and an output connected to said first bus system, said gating means in response to said program generated control signal applying a power failure control signal for testing said first bus system through said first synchronizer device while inhibiting said second synchronizer device from responding to a power failure control signal received from said second bus system.

26. A method of controlling the bidirectional transfer of control signal levels between first and second independently operates bus systems by synchronizer apparatus connected between said bus systems, said method comprising the steps of:
(a) receiving and retransmitting said control signal levels from said first bus system to said second bus system by input and output stages respectively of a first synchronizer device of said apparatus;
(b) receiving and retransmitting said control signal levels from said second bus system by input and output stages respectively of a second synchronizer device of said apparatus;
(c) generating by timing means, first and second complementary clock signals at a predetermined rate;
(d) applying said first and second complementary clock signals to said input and output stages respectively of said first synchronizer device;
(e) applying said first and second complementary clock signals to said output and input stages of said second synchronizer device, the application of said first and second complementary signals in said steps (d) and (e) preventing said input stages of said first and second synchronizer devices from both responding to control signals simultaneously transmitted by said first and second bus systems; and,
(f) interconnecting said input of output stages of said first device and said output stage of said second synchronizer device so that only one control signal is retransmitted from one bus system to another bus system by a corresponding one of synchronizer devices when said control signals are concurrently generated by said bus systems.

27. The method of claim 26 wherein step (f) further includes:
(g) inhibiting said input and output stages of one of said first and second synchronizer devices by another one of said first and second devices from changing state during the time that said another of said first and second synchronizer devices is retransmitting said control signal levels to said another bus system.

28. The method of claim 26 wherein step (f) further includes:
(g) inhibiting said input and output stages of said first synchronizer device by said second synchronizer device and visa versa from changing state during the time that each of said first and second synchronizer devices is retransmitting said control signal levels to said first and second buses respectively.

* * * * *